United States Patent
Lim et al.

(10) Patent No.: US 10,708,019 B2
(45) Date of Patent: Jul. 7, 2020

(54) APPARATUS AND METHOD FOR SUPPORTING MULTIPLE ACCESS IN WIRELESS COMMUNICATION SYSTEM

(71) Applicants: Samsung Electronics Co., Ltd., Suwon-si, Gyeonggi-do (KR); POSTECH ACADEMY-INDUSTRY FOUNDATION, Pohang-si, Gyeongsangbuk-do (KR)

(72) Inventors: Jongbu Lim, Seoul (KR); Namyoon Lee, Pohang-si (KR); Yo-Seb Jeon, Pohang-si (KR); Chanhong Kim, Suwon-si (KR); Yeohun Yun, Hwaseong-si (KR); Sungnam Hong, Suwon-si (KR)

(73) Assignees: Samsung Electronics Co., Ltd., Suwon-si (KR); POSTECH ACADEMY-INDUSTRY FOUNDATION, Pohang-si (KR)

( * ) Notice: Subject to any disclaimer, the term of this patent is extended or adjusted under 35 U.S.C. 154(b) by 31 days.

(21) Appl. No.: 15/891,048

(22) Filed: Feb. 7, 2018

(65) Prior Publication Data
US 2018/0227096 A1    Aug. 9, 2018

(30) Foreign Application Priority Data

Feb. 7, 2017    (KR) .................. 10-2017-0016767

(51) Int. Cl.
*H04L 5/00*     (2006.01)
*H04W 72/08*    (2009.01)
*H04J 11/00*    (2006.01)

(52) U.S. Cl.
CPC ........ *H04L 5/0048* (2013.01); *H04J 11/0023* (2013.01); *H04W 72/082* (2013.01)

(58) Field of Classification Search
None
See application file for complete search history.

(56) References Cited

U.S. PATENT DOCUMENTS

| | | |
|---|---|---|
| 9,240,853 B2 | 1/2016 | Nikopour et al. |
| 2014/0044091 A1 | 2/2014 | Kishiyama |
| 2014/0050279 A1 | 2/2014 | Kishiyama |

(Continued)

OTHER PUBLICATIONS

F. Molisch, "A generic model for MIMO wireless propagation channels in macro- and microcells," IEEE Trans. Sig. Proc., vol. 52, pp. 61-71, Jan. 1, 2004.

(Continued)

*Primary Examiner* — Saumit Shah
(74) *Attorney, Agent, or Firm* — Jefferson IP Law, LLP

(57) ABSTRACT

The present disclosure relates to a pre-5th-Generation (5G) or 5G communication system to be provided for supporting higher data rates beyond 4th-generation (4G) communication system, such as long term evolution (LTE). To support multiple access, a method for operating a terminal is provided. The method includes sending at least one first reference signal over a first resource which supports orthogonal multiple access with at least one other terminal, sending at least one second reference signal over a second resource which supports non-orthogonal multiple access (NOMA) with the at least one other terminal, and sending a data signal according to the NOMA with the at least one other terminal.

18 Claims, 18 Drawing Sheets

(56) References Cited

U.S. PATENT DOCUMENTS

| | | | | |
|---|---|---|---|---|
| 2015/0117391 | A1* | 4/2015 | Rusek | H04L 25/03171 370/330 |
| 2015/0229493 | A1* | 8/2015 | Lee | H04L 25/022 370/252 |
| 2018/0205506 | A1* | 7/2018 | Ren | H04L 5/0001 |
| 2018/0205515 | A1* | 7/2018 | Wu | H04W 72/04 |
| 2019/0044591 | A1* | 2/2019 | Sano | H04B 7/0456 |

OTHER PUBLICATIONS

J.-C. Shen, J. Zhang, E. Alsusa, and K. B. Letaief, "Compressed CSI acquisition in FDD massive MIMO: How much training is needed?", IEEE Trans. Wireless. Commun., vol. 15, No. Jun. 6, 2016.

3GPP TR 25.996 V9.0.0, 3rd Generation Partnership Project; Technical Specification Group Radio Access Network; Spatial channel model for Multiple Input Multiple Output (MIMO) simulations, 2009.

"Overview of non-orthogonal multiple access for 5G", Huawei, HiSilicon, 3GPP TSG RAN WG1 Meeting #84bis R1-162153, Busan, Korea, Apr. 11-15, 2016.

"Multiple access schemes for new radio interface", Intel Corporation, 3GPP TSG RAN WG1 Meeting #84bis R1-162385, Busan, South Korea, Apr. 11-15, 2016.

"PRACH Design for eLAA", Intel Corporation, 3GPP TSG RAN WG1 Meeting #84bis, R1-162358, Busan, Korea, Apr. 11-15, 2016.

"Considerations on DL/UL multiple access for NR", LG Electronics, 3GPP TSG RAN WG1 Meeting #84bis, R1-162517, Busan, Korea, Apr. 11-15, 2016.

"Candidate NR Multiple Access Schemes", Qualcomm Incorporated, 3GPP TSG-RAN WG1 #84b, R1-163510, Busan, Korea, Apr. 11-15, 2016.

"Non-orthogonal multiple access for New Radio", Nokia, Alcatel-Lucent Shanghai Bell, 3GPP TSG-RAN WG1#85, R1-165019, Nanjing, P. R. China, May 23-27, 2016.

"Low code rate and signature based multiple access scheme for New Radio", ETRI, 3GPP TSG-RAN1#85, R1-164869, Nanjing, China, May 23-27, 2016.

"Performance of Interleave Division Multiple Access (IDMA) in Combination with OFDM Family Waveforms", Nokia, Alcatel-Lucent Shanghai Bell, 3GPP TSG-RAN WG1#85 R1-165021, Nanjing, P. R. China, May 23-27, 2016.

* cited by examiner

APPARATUS AND METHOD FOR SUPPORTING MULTIPLE ACCESS IN WIRELESS COMMUNICATION SYSTEM

CROSS-REFERENCE TO RELATED APPLICATION(S)

This application claims the benefit under 35 U.S.C. § 119(a) of a Korean patent application filed on Feb. 7, 2017 in the Korean Intellectual Property Office and assigned Serial number 10-2017-0016767, the entire disclosure of which is hereby incorporated by reference.

TECHNICAL FIELD

The present disclosure relates to a wireless communication system. More particularly, the present disclosure relates to an apparatus and a method for supporting multiple access in the wireless communication system.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'post long-term evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Among them, NOMA can support more users with the same time-frequency time resources than orthogonal multiple access of the related art, thus increasing throughput and reducing radio resources. For the NOMA, techniques using sparsity or diversity are under development in various fields.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for supporting non-orthogonal multiple access (NOMA) of a space domain in a wireless communication system.

Another aspect of the present disclosure is to provide an apparatus and a method for estimating a channel for more terminals than a pilot length in a wireless communication system.

Yet another aspect of the present disclosure is to provide an apparatus and a method for estimating a channel for NOMA using channel information estimated using orthogonal multiple access resource in a wireless communication system.

Still another aspect of the present disclosure is to provide an apparatus and a method for lowering complexity of signal detection in a wireless communication system.

A further aspect of the present disclosure is to provide an apparatus and a method for reducing the number of interference sources between NOMA terminals in a wireless communication system.

In accordance with an aspect of the present disclosure, a method for operating a terminal in a wireless communication system is provided. The method includes sending at least one first reference signal over a first resource which supports orthogonal multiple access with at least one other terminal, sending at least one second reference signal over a second resource which supports NOMA with the at least one other terminal, and sending a data signal according to the NOMA with the at least one other terminal.

In accordance with another aspect of the present disclosure, a method for operating a base station in a wireless communication system is provided. The method includes receiving first reference signals over a first resource which supports orthogonal multiple access with a plurality of terminals, receiving second reference signals over a second resource which supports NOMA with the terminals, and receiving data signals from the terminals according to the NOMA.

In accordance with another aspect of the present disclosure, an apparatus of a terminal in a wireless communication system is provided. The apparatus includes a transmitter configured to send a signal, and at least one processor configured to send at least one first reference signal over a first resource which supports orthogonal multiple access with at least one other terminal, send at least one second reference signal over a second resource which supports NOMA with the at least one other terminal, and send a data signal according to the NOMA with the at least one other terminal.

In accordance with another aspect of the present disclosure, an apparatus of a base station in a wireless communication system is provided. The apparatus includes a receiver configured to receive a signal, and at least one processor configured to receive first reference signals over a first resource which supports orthogonal multiple access with a plurality of terminals, receive second reference signals over a second resource which supports NOMA with the terminals, and receive data signals from the terminals according to the NOMA.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components and structures.

DETAILED DESCRIPTION

Figure 1:
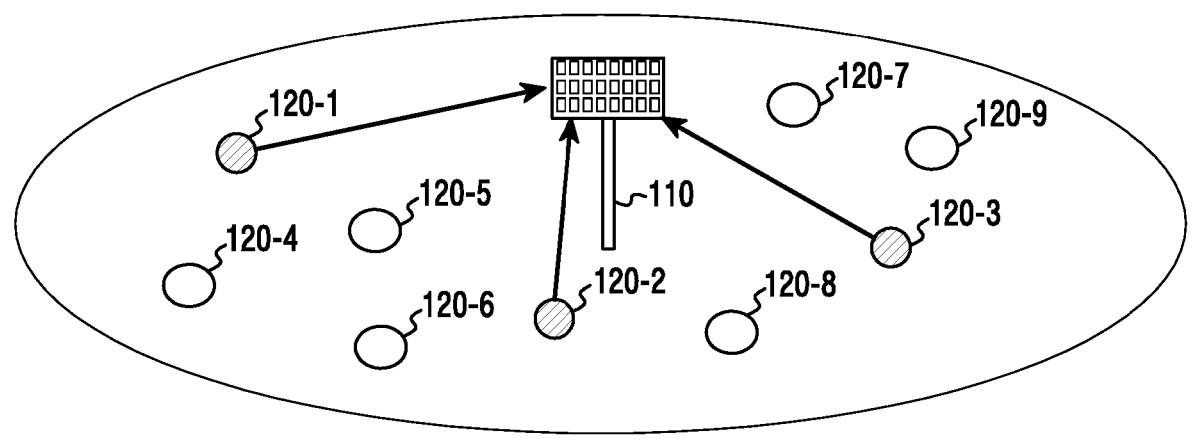
FIG. 1 depicts a wireless communication system according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In various embodiments of the present disclosure described below, a hardware access method is explained as an example. However, the various embodiments of the present disclosure include a technology using all hardware and software and therefore, it is not that the various embodiments of the present disclosure exclude a software based access method.

Hereinafter, the present disclosure provides an apparatus and a method for supporting multiple access in a wireless communication system. More particularly, the present disclosure provides a technique for supporting non-orthogonal multiple access (NOMA) in the wireless communication system.

In the wireless communication system, a multi-antenna system which features spatial diversity and diversity gain is commercialized and actively used. To achieve higher frequency efficiency, a massive multiple input multiple output (MIMO) system adopting tens or hundreds of antennas in a base station is also being discussed. The multiple access is expected to employ the NOMA beyond orthogonal multiple access of the related art. However, techniques for the NOMA in a space domain established by the multiple antennas are rare. In this regard, the present disclosure provides a technique for the NOMA in the space domain in the wireless communication system.

In the following explanation, terms indicating signals, terms indicating signal processing methods, terms indicating channels, terms indicating channel control information, terms indicating network entities, and terms indicating components of a device are mentioned for the sake of explanations. Accordingly, the present disclosure is not limited to the terms to be described, and can use other terms having technically identical meaning.

To ease the understanding, terms and names defined in some communication standards (e.g., a long term evolution (LTE) system and an LTE-advanced (LTE-A) system) can be used. Various embodiments of the present disclosure can be easily modified and applied to other communication systems.

FIG. 1 depicts a wireless communication system according to various embodiments of the present disclosure.

Referring to FIG. 1, a base station 110 and terminals 120-1 through 120-9 are illustrated as some of nodes which use a radio channel in the wireless communication system. While the single base station is illustrated in FIG. 1, the same or similar base station to the base station 110 can be further included.

The base station 110 is a network infrastructure which provides radio access to the terminals 120-1 through 120-9. The base station 110 has coverage defined as a certain geographical region based on a signal transmission distance. The base station 110 can use an antenna including M-ary antenna elements. The base station 110 can be referred to as an access point (AP), an evolved nodeB (eNodeB, eNB), a 5th generation (5G) node, a wireless point, a transmission/reception point (TRP), or other term having the technically equivalent meaning.

The terminals 120-1 through 120-9, which are used by a user, communicate with the base station 110 over a wireless channel. In some cases, at least one of the terminals 120-1 through 120-9 can be operated without user involvement. For example, at least one of the terminals 120-1 through 120-9 performs machine type communication (MTC) and may not be carried by the user. The terminals 120-1 through 120-9 each can be referred to as a user equipment (UE), a mobile station, a subscriber station, a remote terminal, a wireless terminal, a user device, or other term having the technically equivalent meaning.

The base station 110 and the terminals 120-1 through 120-9 can send and receive radio signals in a millimeter wave (mmWave) band (e.g., 28 GHz, 30 GHz, 38 GHz, 60 GHz). For improve a channel gain, the base station 110 and the terminals 120-1 through 120-9 can perform beamforming. Herein, the beamforming includes transmit beamforming and receive beamforming. For example, the base station 110 and the terminals 120-1 through 120-9 can give directivity to a transmission signal or a receive signal. For doing so, the base station 110 and the terminals 120-1 through 120-9 can select serving beams through beam search.

Some of the terminals 120-1 through 120-9, that is, the terminal 120-1, the terminal 120-2, and the terminal 120-3 are active users and the other terminals are inactive users. For example, the three terminals 120-1, 120-2, and 120-3 perform the multiple access in FIG. 1. For doing so, the terminals 120-1, 120-2, and 120-3 and the base station 110 can execute a multiple access process to be explained.

Figure 2A:
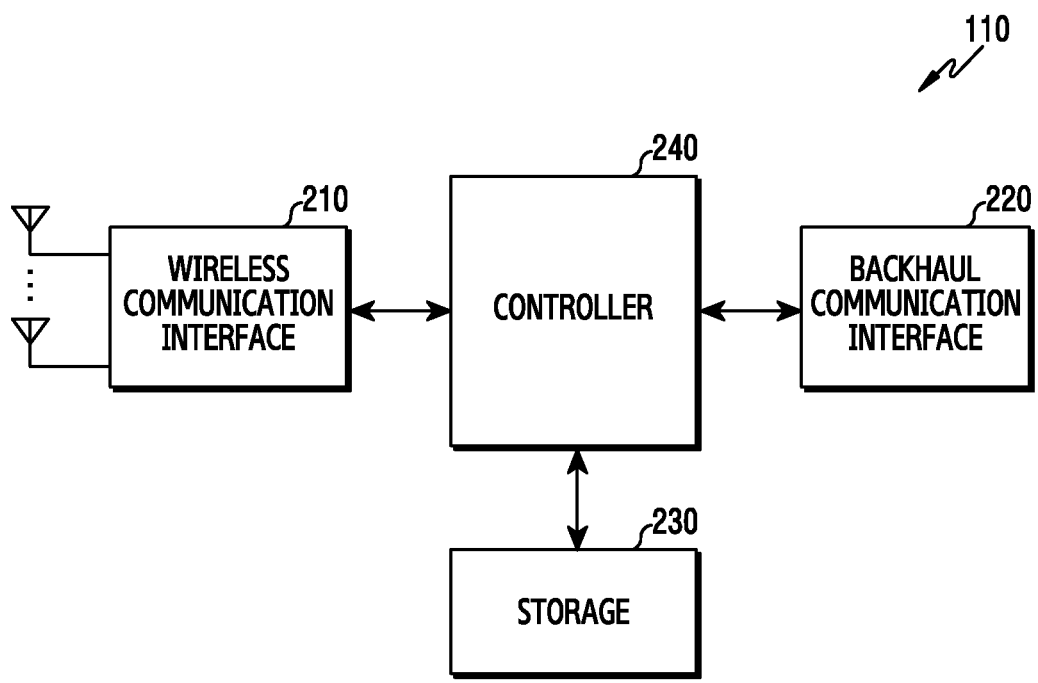
FIG. 2A depicts a base station in a wireless communication system according to various embodiments of the present disclosure.

FIG. 2A depicts a base station in a wireless communication system according to various embodiments of the present disclosure. A configuration of FIG. 2A can be construed as the configuration of the base station 110. A term, such as 'part' or '~er' indicate a unit for processing at least one function or operation, and can be implemented using hardware, software, or a combination of hardware and software.

Referring to FIG. 2A, the base station 110 includes a wireless communication interface 210, a backhaul communication interface 220, a storage 230, and a controller 240.

The wireless communication interface 210 can send and receive signals over a radio channel. For example, the wireless communication interface 210 performs a conversion function between a baseband signal and a bit string according to a physical layer standard of a system. For example, in data transmission, the wireless communication interface 210 generates complex symbols by encoding and modulating a transmit bit string. In addition, in data reception, the wireless communication interface 210 restores a receive bit string by demodulating and decoding a baseband signal. In addition, the wireless communication interface 210 up-converts the baseband signal to a radio frequency (RF) band signal, transmits it via an antenna, and down-converts an RF band signal received via an antenna to a baseband signal.

For doing so, the wireless communication interface 210 can include a transmit filter, a receive filter, an amplifier, a mixer, an oscillator, a digital to analog convertor (DAC), an analog to digital convertor (ADC), and the like. In addition, the wireless communication interface 210 can include a plurality of transmit and receive paths. Further, the wireless communication interface 210 can include at least one antenna array including a plurality of antenna elements. In view of hardware, the wireless communication interface 210 can include a digital circuit and an analog circuit, and the analog unit can include a plurality of sub-units according to an operating power and an operating frequency.

As such, the wireless communication interface 210 sends and receives the signals. Hence, the wireless communication interface 210 can be referred to as a transmitting unit, a receiving unit, or a transceiving unit. Hereafter, the transmission and the reception over the wireless channel embrace the above-stated processing of the wireless communication interface 210.

The backhaul communication interface 220 provides an interface for communicating with other nodes in the network. For example, the backhaul communication interface 220 converts a bit sting transmitted from the base station 110 to other node, for example, other access node, another base station, an upper node, or a core network, to a physical signal, and converts a physical signal received from the other node to a bit string.

The storage 230 stores a basic program for operating the base station 110, an application program, and data, such as setting information. The storage 230 can include a volatile memory, a non-volatile memory, or a combination of a volatile memory and a non-volatile memory. The storage 230 provides the stored data according to a request of the controller 240.

The controller 240 controls general operations of the base station 110. For example, the controller 240 sends and receives signals through the wireless communication interface 210 or the backhaul communication interface 220. In addition, the controller 240 records and reads data in and from the storage 230. The controller 240 can include at least one processor. According to various embodiments of the present disclosure, the controller 240 can control the base station 110 to carry out operations to be explained. For doing so, the controller 240 can include at least one of modules of FIG. 2B.

Figure 2B:
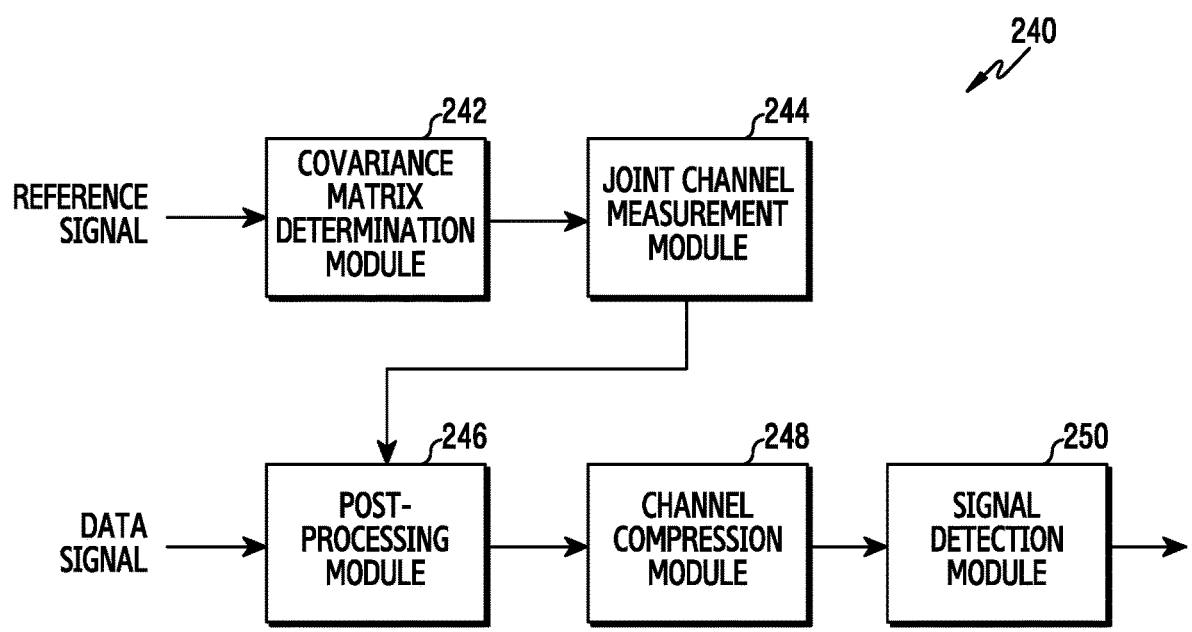
FIG. 2B depicts a controller of a base station in a wireless communication system according to various embodiments of the present disclosure.

FIG. 2B depicts a controller of a base station in a wireless communication system according to various embodiments of the present disclosure.

Referring to FIG. 2B, the controller 240 can include a covariance matrix determination module 242, a joint channel measurement module 244, a post-processing module 246, a channel compression module 248, and a signal detection module 250. Herein, the modules of FIG. 2B each can be, as an instruction set or codes stored in the storage 230, instructions/codes resided in the controller 240 at least temporarily, a storage space storing the instructions/code, or part of a circuitry of the controller 240.

The covariance matrix determination module 242 and the joint channel measurement module 244 determine channel information according to the NOMA of the space domain. Specifically, the covariance matrix determination module 242 generates long-term channel information of NOMA terminals. For example, the long-term channel information can include a channel covariance matrix. The channel covariance matrix is information indicating a channel size and can be determined based on two or more channel measurement results. The joint channel measurement module 244 generates a channel matrix corresponding to the NOMA. In so doing, the joint channel measurement module 244 can use a long-term channel matrix. To facilitate explanations, the channel corresponding to the NOMA is referred to as a joint channel.

The post-processing module 246, the channel compression module 248, and the signal detection module 250 detect a transmission signal from a received data signal using the channel information. Specifically, the post-processing module 246 processes receive signals to enable or facilitate channel compression of the channel compression module 248. The post-processing module 246 can be referred to as a linear beamforming module. The channel compression module 248 processes some of channel matrix elements as noise and thus reduces the number of channel elements to consider in signal detection. For example, the channel compression module 248 converts the channel matrix to a sparse matrix. The signal detection module 250 detects transmission signals based on some noise elements, that is, the compressed channel information. For example, the signal detection module 250 can use maximum likelihood (ML) detection. In this case, the signal detection module 250 can be referred to as a low-complexity ML decoder.

Figure 3:
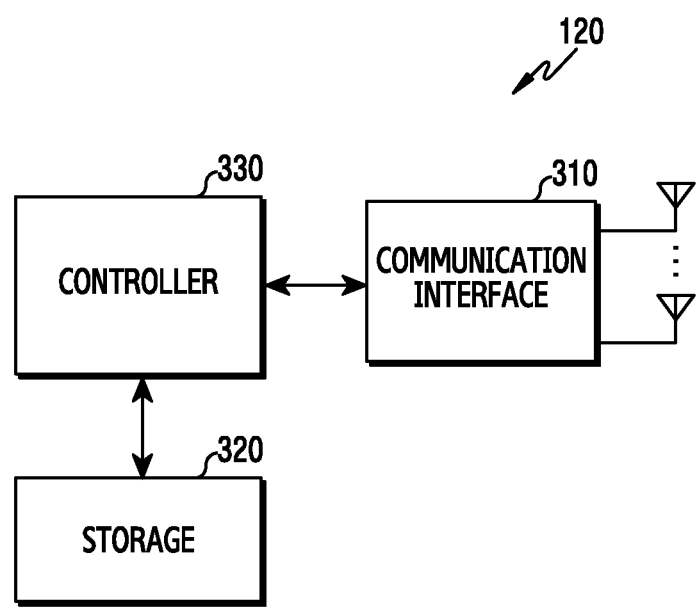
FIG. 3 depicts a terminal in a wireless communication system according to various embodiments of the present disclosure.

FIG. 3 depicts a terminal in a wireless communication system according to various embodiments of the present disclosure. A configuration of FIG. 3 can be construed as the configuration of any one of the terminals 120-1 through 120-9. A term, such as 'part' or '~er' indicate a unit for processing at least one function or operation, and can be implemented using hardware, software, or a combination of hardware and software.

Referring to FIG. 3, the terminal 120 includes a communication interface 310, a storage 320, and a controller 330.

The communication interface 310 can send and receive signals over a radio channel. For example, the communication interface 310 performs a conversion function between a baseband signal and a bit string according to a physical layer standard of a system. For example, in data transmission, the communication interface 310 generates complex symbols by encoding and modulating a transmit bit string. In addition, in data reception, the communication interface 310 restores a receive bit string by demodulating and decoding a baseband signal. In addition, the communication interface 310 up-converts the baseband signal to an RF band signal, transmits it via an antenna, and down-converts an RF band signal received via the antenna to a baseband signal. For example, the communication interface 310 can include a transmit filter, a receive filter, an amplifier, a mixer, an oscillator, a DAC, an ADC, and the like.

In addition, the communication interface 310 can include a plurality of transmit and receive paths. Further, the communication interface 310 can include at least one antenna array including a plurality of antenna elements. In view of hardware, the communication interface 310 can include a digital circuit and an analog circuit (e.g., an RF integrated circuit (RFIC)). Herein, the digital circuit and the analog circuit can be implemented as a single package. In addition, the communication interface 310 can include a plurality of RF chains. Further, the communication interface 310 can perform the beamforming.

As such, the communication interface 310 sends and receives the signals. Hence, the communication interface 310 can be referred to as a transmitting unit, a receiving unit, or a transceiving unit. Hereafter, the transmission and the reception over the wireless channel embrace the above-stated processing of the communication interface 310.

The storage 320 stores a basic program for operating the terminal 120, an application program, and data, such as setting information. The storage 320 can include a volatile memory, a non-volatile memory, or a combination of a volatile memory and a non-volatile memory. The storage 320 provides the stored data according to a request of the controller 330.

The controller 330 controls general operations of the terminal 120. For example, the controller 330 sends and receives signals through the communication interface 310. In addition, the controller 330 records and reads data in and from the storage 320. For doing so, the controller 330 can include at least one processor or microprocessor, or part of a processor. Part of the communication interface 310 and the controller 330 can be referred to as a communication processor (CP). More particularly, the controller 330 controls the terminal 120 to carry out the NOMA in the space domain. For example, the controller 330 can control the terminal 120 to perform operations to be explained.

Figure 4A:
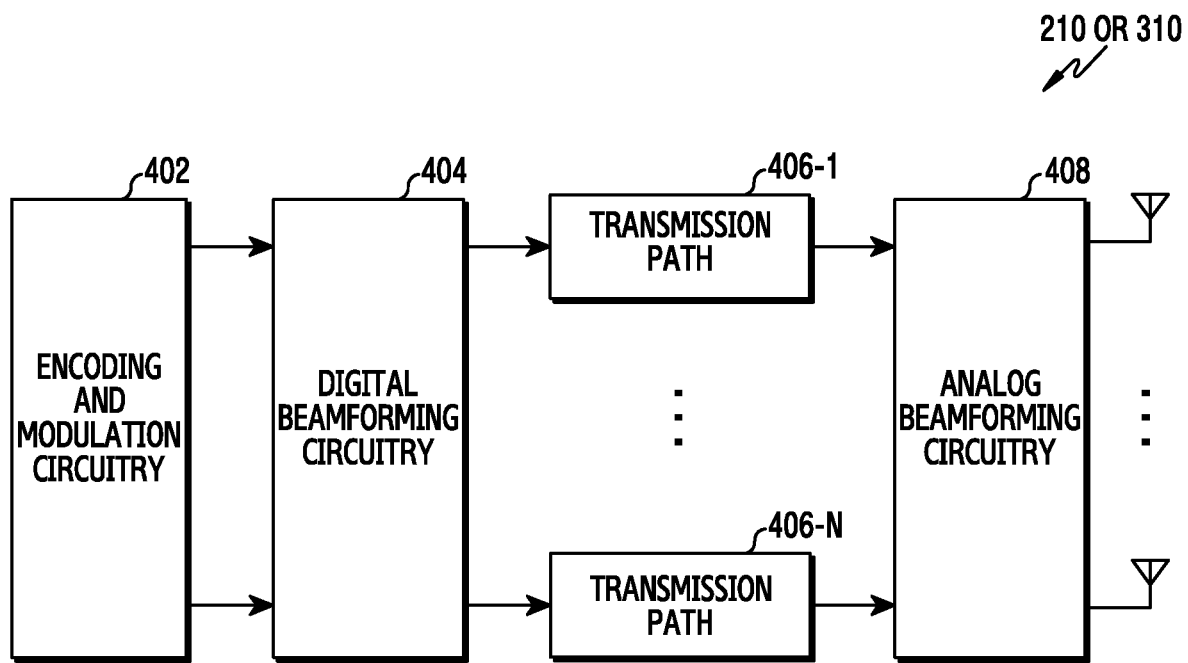
FIGS. 4A, 4B, and 4C depict a communication interface in a wireless communication system according to various embodiments of the present disclosure.
Figure 4B:
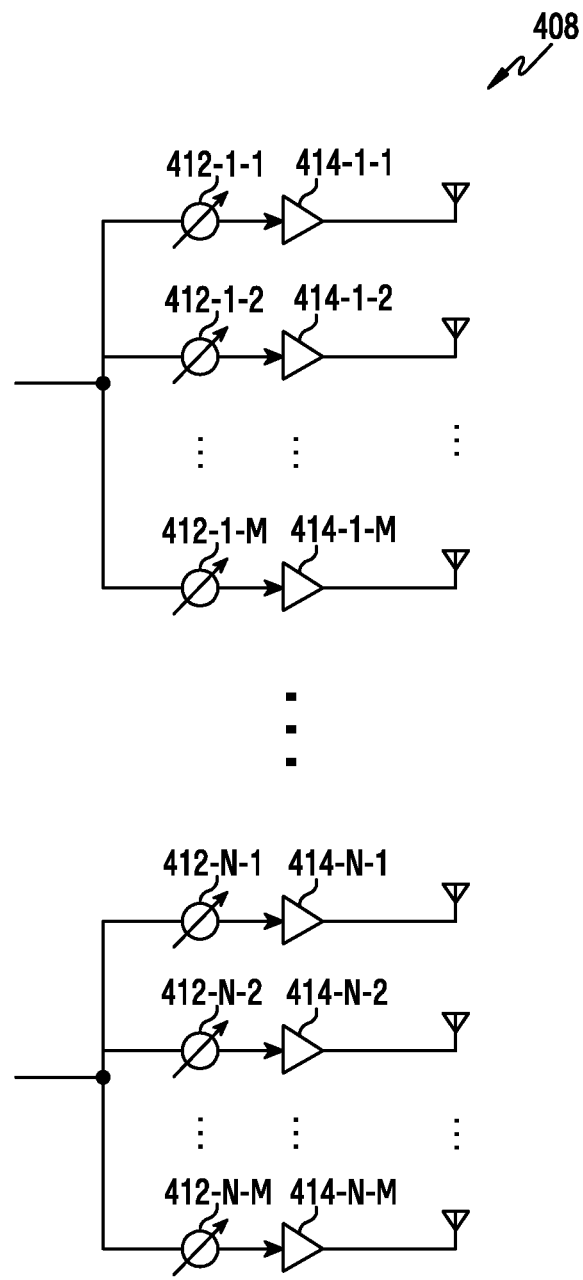
Figure 4C:
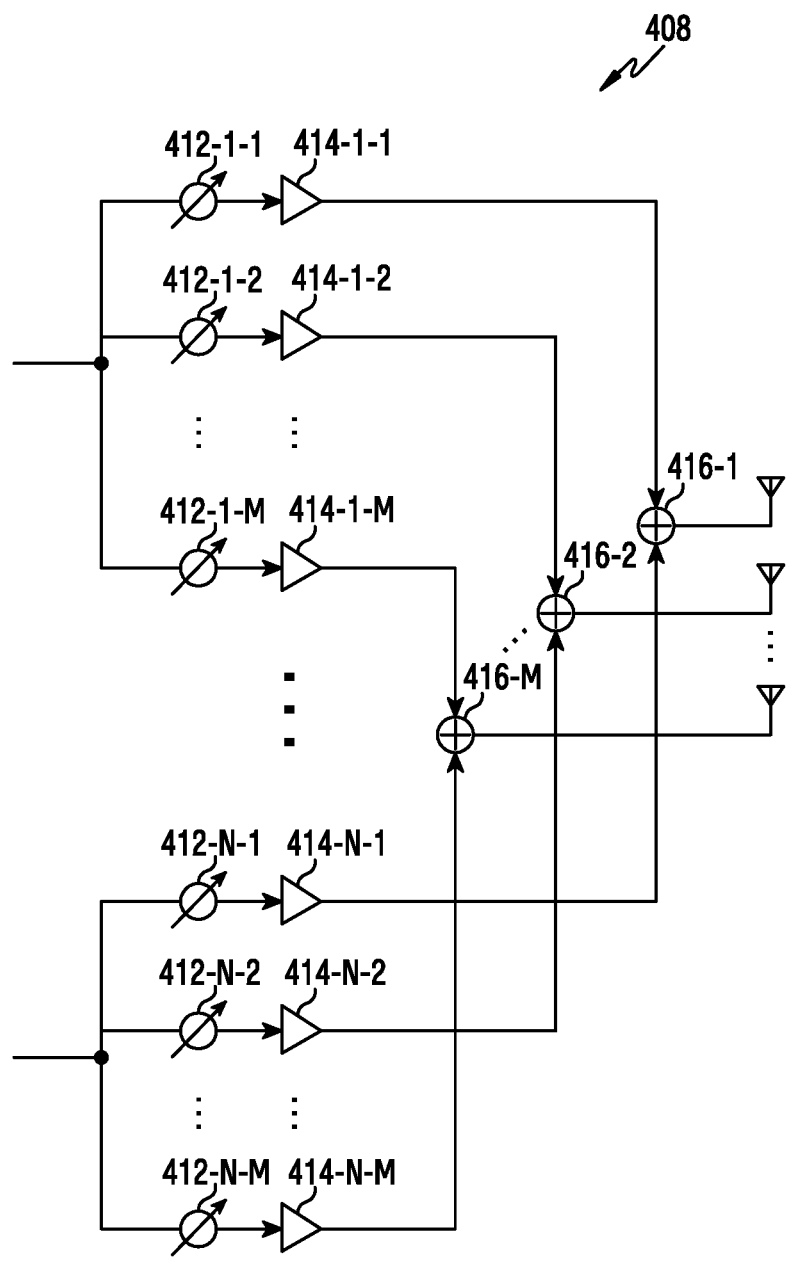

FIGS. 4A, 4B, and 4C depict a communication interface in a wireless communication system according to various embodiments of the present disclosure. FIGS. 4A, 4B, and 4C show a specific configuration of the wireless communication interface 210 of FIG. 2A or the communication interface 310 of FIG. 3. More particularly, FIGS. 4A, 4B, and 4C show components for the beamforming, as part of the wireless communication interface 210 of FIG. 2A or the communication interface 310 of FIG. 3.

Referring to FIG. 4A, the wireless communication interface 210 or 310 includes an encoding and modulation circuitry 402, a digital beamforming circuitry 404, transmission paths 406-1 through 406-N, and an analog beamforming circuitry 408.

The encoding and modulation circuitry 402 encodes a channel. For the channel encoding, at least one of low density parity check (LDPC) code, convolution code, and polar code can be used. The encoding and modulation circuitry 402 generates modulation symbols through constellation mapping.

The digital beamforming circuitry 404 beamforms a digital signal (e.g., the modulation symbols). For doing so, the digital beamforming circuitry 404 multiplies the modulation symbols by beamforming weights. Herein, the beamforming weights are used to change a level and a phase of a signal and can be referred to as a precoding matrix or a precoder. The digital beamforming circuitry 404 outputs the digital-beamformed modulation symbols to the transmission paths 406-1 through 406-N. In so doing, according to MIMO transmission, the modulation symbols can be multiplexed or the same modulation symbols can be fed to the transmission paths 406-1 through 406-N.

The transmission paths 406-1 through 406-N convert the digital-beamformed digital signals to analog signals. For doing, the transmission paths 406-1 through 406-N each can include an inverse fast fourier transform (IFFT) operator, a cyclic prefix (CP) adder, a DAC, and an up-converter. The CP adder is used for orthogonal frequency division multiplexing (OFDM) and can be excluded when another physical layer scheme (e.g., filter bank multi-carrier (FBMC)) is applied. For example, the transmission paths 406-1 through 406-N provide an independent signal process for a plurality of streams generated through the digital beamforming. Notably, depending on the implementation, some of the components of the transmission paths 406-1 through 406-N can be used in common.

The analog beamforming circuitry 408 beamforms the analog signals. For doing so, the analog beamforming circuitry 408 multiples the analog signals by the beamforming weights. Herein, the beamforming weights are used to change the level and the phase of the signal. Specifically, according to couplings between the transmission paths 406-1 through 406-N and antennas, the analog beamforming circuitry 408 can be configured as shown in FIG. 4B or 4C.

Referring to FIG. 4B, the signals input to the analog beamforming circuitry 408 go through phase/level conversion and amplification and then are transmitted via the antennas. The signals of the paths are transmitted via different antenna sets, that is, via different antenna arrays. The signals fed along the first path are converted to a signal sequence having different or same phase/level by phase/level converters 412-1-1 through 412-1-M, amplified by amplifiers 414-1-1 through 414-1-M, and then transmitted via the antennas.

Referring to FIG. 4C, the signals input to the analog beamforming circuitry 408 go through phase/level conversion and amplification and then are transmitted via the antennas. The signals of the paths are transmitted via the same antenna set, that is, the same antenna array. The signals fed along the first path are converted to a signal sequence having the same phase/level by the phase/level converters 412-1-1 through 412-1-M and amplified by the amplifiers 414-1-1 through 414-1-M. The amplified signals are summed by adders 416-1 through 416-M based on the antenna element so as to transmit the signals via one antenna array, and then transmitted via the antennas.

The independent antenna array per transmission path is used in FIG. 4B, and the transmission paths share one antenna array in FIG. 4C. According to another embodiment of the present disclosure, some transmission paths can use their independent antenna array and other transmission paths can share one antenna array. Further, according to yet another embodiment of the present disclosure, a switchable structure can be applied between the transmission paths and the antenna arrays to adaptively modify the structure according to a situation.

Figure 5:
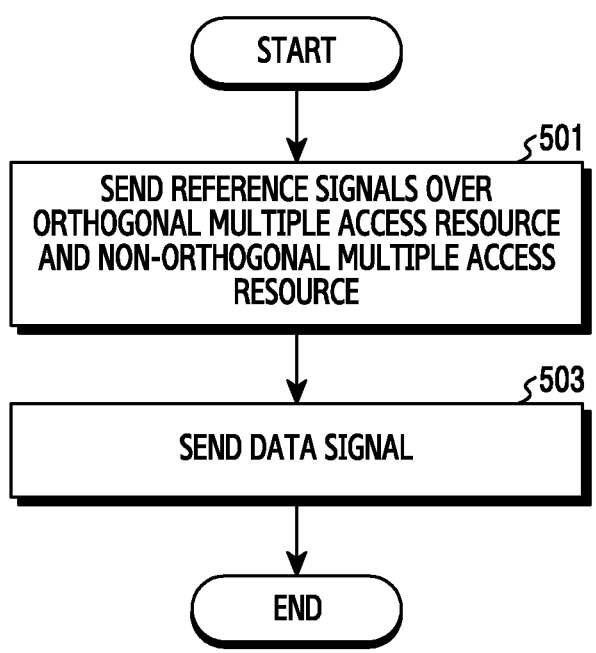
FIG. 5 depicts an operating method of a terminal in a wireless communication system according to various embodiments of the present disclosure.

FIG. 5 depicts an operating method of a terminal in a wireless communication system according to various embodiments of the present disclosure. FIG. 5 illustrates an operating method of one of the terminals 120-1, 120-2, and 120-3.

Referring to FIG. 5, in operation 501, the terminal sends reference signals over orthogonal multiple access resource and NOMA resource. The terminal sends at least one reference signal over the orthogonal multiple access resource and sends at least one other reference signal over the NOMA resource. Herein, before sending at least one other reference signal, the terminal can receive allocation information of other reference signal. Herein, the orthogonal multiple access resource and the NOMA resource can be included in different subframes. For example, depending on a multiple access interval of each frame, the terminal can send at least one reference signal and data in one subframe using the orthogonal scheme and send at least one other reference signal and data in another subframe using the non-orthogonal scheme. At least one reference signal over the orthogonal multiple access resource can be used to generate long-term channel information, and at least one other reference signal over the NOMA resource can be used to generate joint channel information. Herein, the reference signal includes predefined values used for channel estimation. The reference signal can be named variously according to a system standard. For example, the reference signal can be referred to as a preamble, a random access preamble, a sounding reference signal (SRS), a midamble, and other term having the technically equivalent meaning.

In operation 503, the terminal sends a data signal. For example, the terminal can request uplink resource allocation from the base station, receive an uplink resource grant from the base station, and send the data signal over the allocated uplink resource. In so doing, the terminal can send the data signal during the multiple access with at least one other terminal in the space domain. For example, the terminal can send the data signal using the same time-frequency resource as the at least one other terminal.

Although not illustrated in FIG. 5, before sending the reference signals, the terminal can identify orthogonal multiple access resource. For example, the terminal can receive orthogonal multiple access resource allocation information from the base station. For example, the orthogonal multiple access resource allocation information can be broadcast as system information, or signaled in a network entry procedure of the terminal.

Figure 6:
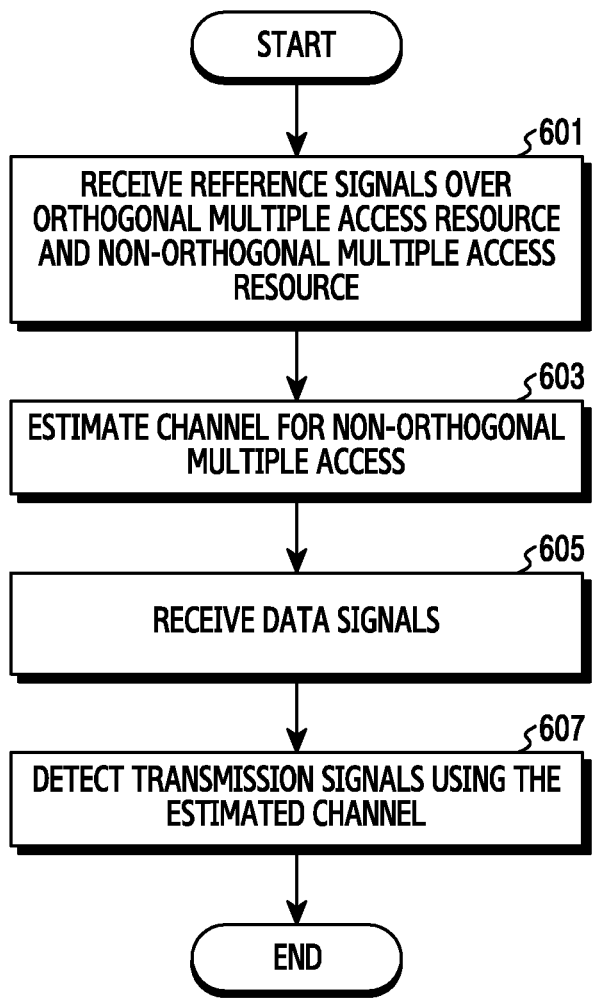
FIG. 6 depicts an operating method of a base station in a wireless communication system according to various embodiments of the present disclosure.

FIG. 6 depicts an operating method of a base station in a wireless communication system according to various embodiments of the present disclosure.

FIG. 6 illustrates an operating method of the base station 110.

Referring to FIG. 6, in operation 601, the base station receives reference signals over orthogonal multiple access resource and NOMA resource. The base station receives at least one reference signal over the orthogonal multiple access resource and at least one other reference signal over the NOMA resource from terminals. Herein, the orthogonal multiple access resource and the NOMA resource can be included in different subframes. For example, depending on a multiple access interval of each frame, the base station can receive at least one reference signal and data in one subframe using the orthogonal scheme and receive at least one other reference signal and data in another subframe using the non-orthogonal scheme. Herein, the reference signal includes predefined values used for channel estimation. The reference signal can be named variously according to a system standard. For example, the reference signal can be referred to as a preamble, a random access preamble, an SRS, a midamble, and other term having the technically equivalent meaning.

In operation 603, the base station estimates a channel for the NOMA. For example, the base station generates long-term channel information using the reference signals received for the orthogonal multiple access resource. For example, the long-term channel information is a channel size average of each terminal and can include a covariance matrix. The base station can determine joint channel information based on the long-term channel information. In so doing, the base station can use spatial sparsity of a multi-path channel. More specifically, the base station can generate the joint channel information of more terminals than the reference signal length by decreasing a dimension of a channel matrix to estimate based on effective paths, that is, based on scatterers.

In operation 605, the base station receives data signals. For example, the base station can receive an uplink resource allocation request from terminals, send an uplink resource grant to the terminals, and receive the data signals over the allocated uplink resource. In so doing, the base station can receive the data signals from the terminals multi-accessing in the space domain. For example, the base station can receive the data signals from the terminals using the same time-frequency resource.

In operation 607, the base station detects transmission signals using the estimated channel. Namely, the base station performs MIMO detection. To lower computational complexity, the base station post-process and compress the received data signals.

As such, by use of the orthogonal multiple access resource and the NOMA resource, the joint channel for the NOMA in the space domain can be estimated. In the following, the channel estimation shall be elucidated.

Figure 7:
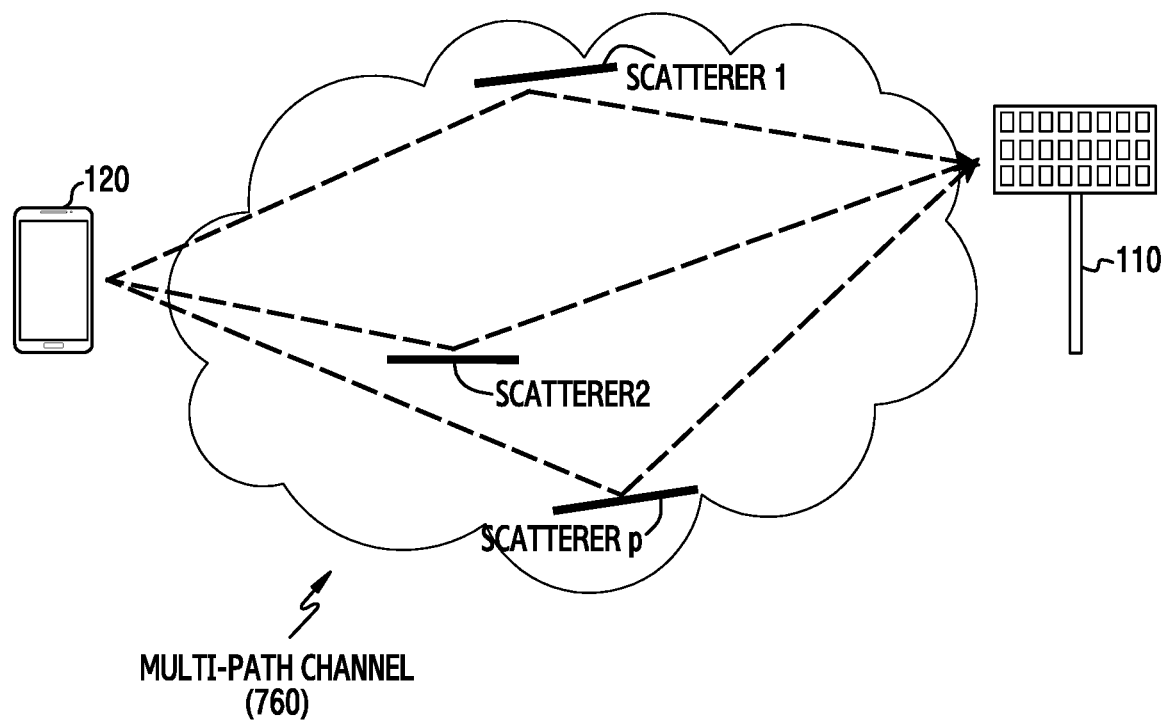
FIG. 7 depicts a multi-path channel between a terminal and a base station in a wireless communication system according to various embodiments of the present disclosure.

FIG. 7 depicts a multi-path channel between a terminal and a base station in a wireless communication system according to various embodiments of the present disclosure.

Referring to FIG. 7, a multi-path channel 760 including a plurality of scatterers is illustrated. Now, a channel established in the multi-path channel 760 of FIG. 7 is mathematically modeled and spatial sparsity in the multi-path channel 760 is explained.

A channel between a k-th terminal and a base station in a multi-user (MU) MIMO communication system can be expressed as Equation 1.

$$h_k = R_k^{1/2} \tilde{h}_k \qquad \text{Equation 1}$$

In Equation 1, $h_k$ denotes the channel between the k-th terminal and the base station, $\tilde{h}_k$ denotes an effective channel vector including independent elements and following the same distribution, and $R_k$ denotes a covariance matrix of the channel established by the k-th terminal. The covariance matrix $R_k$ corresponds to a spatial signature formed by a multi-path built between the k-th terminal and the base station and a multi-antenna. The channel vector of Equation 1 can be expressed as Equation 2 based on a multi-path effect.

$$h_k = \sum_{p=1}^{P} \tilde{h}_k^p a(\theta_k^p) = A_k \tilde{h}_k \qquad \text{Equation 2}$$

$$a(\theta) = \frac{1}{\sqrt{M}} [1, e^{-j\pi \cos\theta}, \ldots, e^{-j\pi(M-1)\cos\theta}]^\top$$

In Equation 2, $h_k$ denotes the channel between the k-th terminal and the base station, $\tilde{h}_k^p$ denotes a channel gain of a p-th path in the multi-path channel, $a(\theta_k^p)$ denotes an angle of arrival (AOA) of the p-th path of the multi-path channel, P denotes the number of the paths in the multi-path channel, $A_k$ denotes a matrix indicating directions of the multi-paths of the k-th terminal, $\tilde{h}_k$ denotes a channel gain matrix of the k-th terminal, and M denotes the number of antenna elements of the base station.

Based on Equation 2, the covariance matrix $R_k = A_k A_k^H$ can be acquired. When the number of the scatterers (=P) of the multi-path is smaller than the number of the antennas (=M) of the base station, a rank of the covariance matrix satisfies Equation 3.

$$\text{rank}(R_k) = \text{rank}(A_k A_k^H) = P < M \qquad \text{Equation 3}$$

In Equation 3, $R_k$ denotes the covariance matrix of the channel of the k-th terminal, $A_k$ denotes the matrix indicating the directions of the multi-paths of the k-th terminal, P denotes the number of the scatterers, and M denotes the number of the antennas of the base station.

In this case, a length of the effective channel vector in the channel vector of Equation 1 is smaller than the number of the antennas (=M) of the base station. When the effective channel vector length is smaller than the actual channel length, the spatial sparsity can be expressed.

Various embodiments of the present disclosure provide a channel estimation method for efficiently reducing time resources consumed in the channel estimation using the spatial sparsity in the base station in a massive MIMO communication system. To fulfill the present channel estimation method, long-term channel information (e.g., a covariance matrix) of each terminal is required. Hence, the present channel estimation method includes estimating the long-term channel information and estimating a joint space-time channel.

To estimate the covariance matrix, orthogonal space division multiple access can be considered.

Figure 8A:
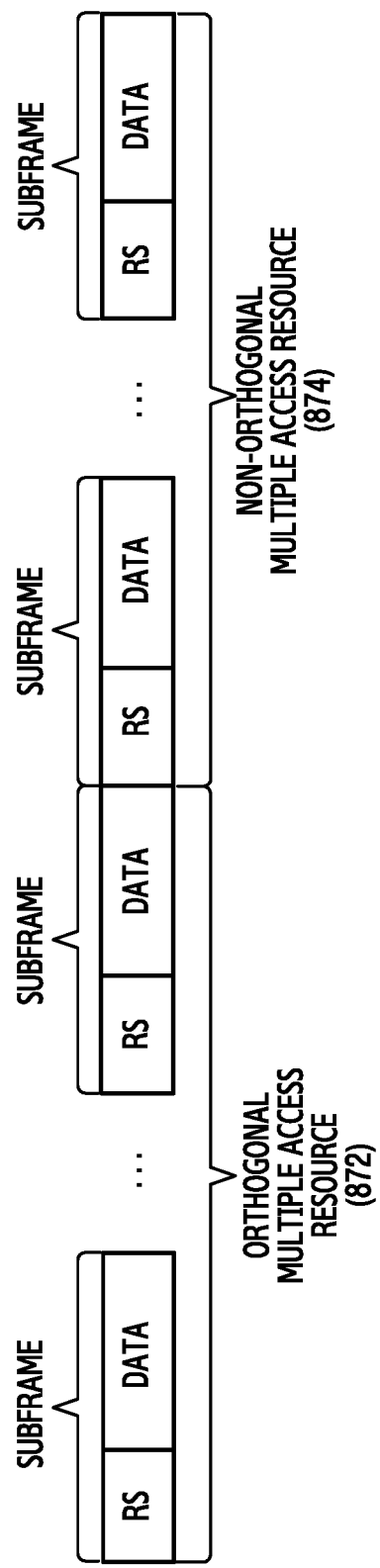
FIGS. 8A, 8B, and 8C depict frame management in a wireless communication system according to various embodiments of the present disclosure.
Figure 8B:
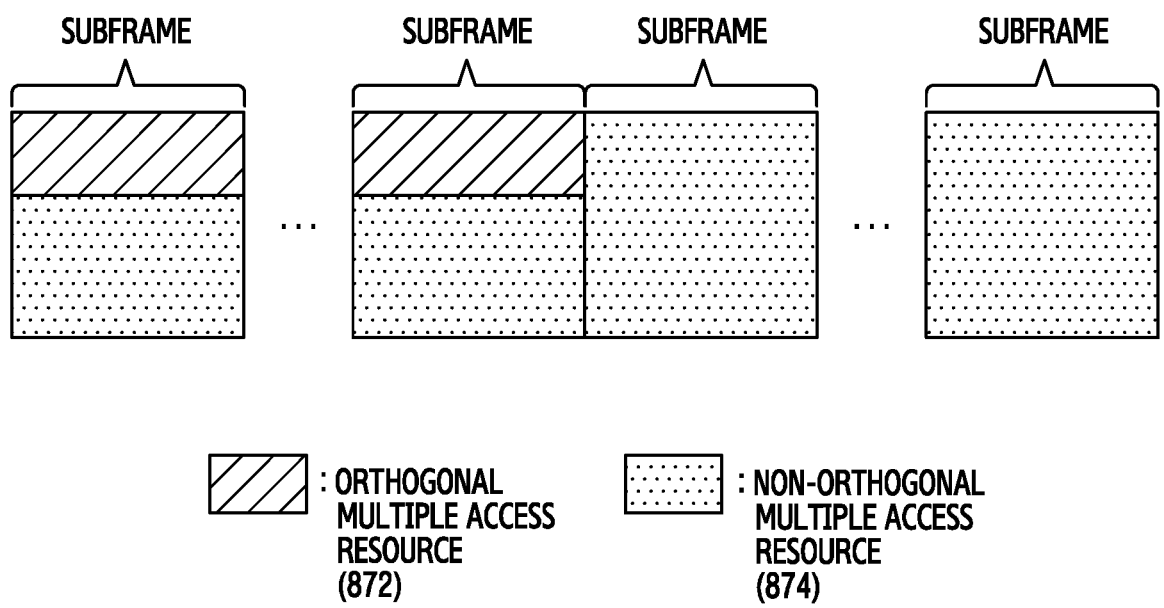
Figure 8C:
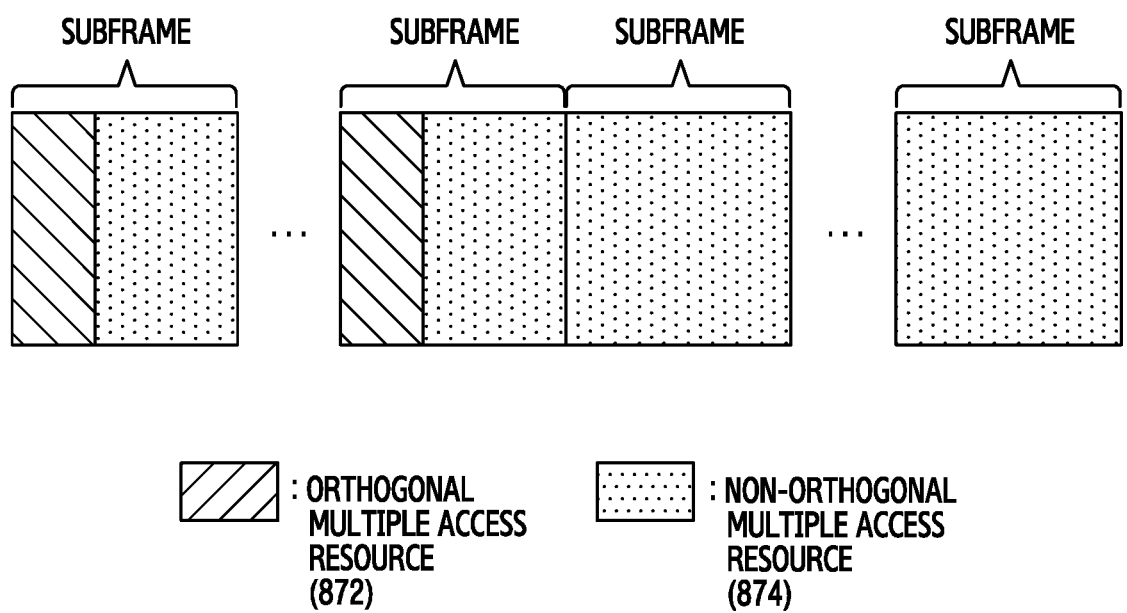

FIGS. 8A, 8B, and 8C depict frame management in a wireless communication system according to various embodiments of the present disclosure. FIGS. 8A, 8B, and 8C show a transport frame structure for obtaining covariance matrix information.

Referring to FIGS. 8A, 8B, and 8C, each transport frame includes a resource 872 for supporting the orthogonal space division multiple access (hereafter, referred to as an orthogonal multiple access resource) and a resource 874 for supporting non-orthogonal space division multiple access (hereafter, referred to as a NOMA resource).

According to an embodiment of the present disclosure, a plurality of subframes can be allocated as the orthogonal multiple access resource 872 and a plurality of other subframes can be allocated as the NOMA resource 874 as shown in FIG. 8A. For example, the orthogonal multiple access resource 872 can be allocated on the subframe basis. According to another embodiment of the present disclosure, the orthogonal multiple access resource 872 can occupy part of the subframe as shown in FIGS. 8B and 8C. Specifically, in some subframes, the orthogonal multiple access resource 872 can be allocated in some frequency domain as shown in FIG. 8B or in some time domain as shown in FIG. 8C. Alternatively, although not depicted, the orthogonal multiple access resource 872 can be allocated in some frequency domain and sometime domain of the subframe.

Herein, long-term channel information for estimating a joint channel can be reused after one estimation. Hence, when a terminal for the NOMA is newly connected or a new MU group is determined, the orthogonal multiple access resource 872 can be allocated temporarily. For example, the orthogonal multiple access resource 872 can be allocated in some frames. Accordingly, even when the orthogonal multiple access resource 872 is allocated in some subframes as shown in FIGS. 8B and 8C, variable frame management is enabled according to the determination of the base station. In this case, the base station can notify terminals of at least one of the allocation of the orthogonal multiple access resource 872, and a location and a size of the orthogonal multiple access resource 872, using downlink control information or system information.

Using the orthogonal multiple access resource 872 of FIG. 8A, 8B, 8C, or other type, the base station can select up to M-ary terminals per subframe and support the space division multiple access. The base station can estimate a covariance matrix of each terminal based on the terminal channel information estimated using the orthogonal multiple access resource 872. For example, the base station can use a statistical variance of the estimated channels of the terminals as an estimated value of the covariance matrix.

In the join time-space channel estimation (e.g., in operation 603 of FIG. 6), the base station estimates a non-orthogonal space division multiple access channel using the estimated covariance matrix. Given that a pilot signal of a random access preamble of the k-th terminal is $x_k$, a receive signal of the base station for pilot signals of active terminals can be expressed as Equation 4.

$$Y = \sum_{k \in \mathcal{A}} h_k x_k^\top + N = \sum_{k \in \mathcal{A}} U_k \tilde{h}_k x_k^\top + N \qquad \text{Equation 4}$$

In equation 4, Y denotes a receive signal matrix, $h_k$ denotes the channel between the k-th terminal and the base station, $x_k$ denotes the pilot signal of the preamble transmitted by the k-th terminal, A denotes an index set of the active terminals, N denotes a noise matrix, $U_k$ denotes a left singular vector matrix acquired by singular value decomposition $R_k^{1/2}=U_k\Lambda_k^{1/2}V_k^H$ of the covariance matrix of the k-th terminal, and $\tilde{h}_k$ denotes the effective channel vector of the k-th terminal. Herein, a new effective channel vector can be expressed as $\tilde{h}_k=\Lambda_k^{1/2}V_k^H\bar{h}_k$.

The receive signal of Equation 4 can be expressed as Equation 5.

$$vec(Y) = \sum_{k \in \mathcal{A}}(x_k \otimes U_k)\tilde{h}_k + vec(N) \quad \text{Equation 5}$$

In Equation 5, vec(Y) denotes a vector including columns of the receive signal matrix, A denotes the index set of the active terminals, $x_k$ denotes the pilot signal of the preamble transmitted by the k-th terminal, $\otimes$ denotes a Kronecker multiplier, $U_k$ denotes the left singular vector matrix of the covariance matrix of the k-th terminal, $\tilde{h}_k$ denotes the effective channel vector of the k-th terminal, and vec (N) denote a vector including columns of the noise matrix. When A={1, 2, 3, . . . , K}, Equation 5 can be expressed as Equation 6.

$$\begin{bmatrix} y_1 \\ y_2 \\ \vdots \\ y_L \end{bmatrix} = \begin{bmatrix} x_{1,1}U_1 & x_{2,1}U_2 & \cdots & x_{K,1}U_K \\ x_{1,2}U_1 & x_{2,2}U_2 & \cdots & x_{K,2}U_K \\ \vdots & \vdots & \ddots & \vdots \\ x_{1,L}U_1 & x_{2,L}U_2 & \cdots & x_{K,L}U_K \end{bmatrix} \begin{bmatrix} \tilde{h}_1 \\ \tilde{h}_2 \\ \vdots \\ \tilde{h}_K \end{bmatrix} + \begin{bmatrix} n_1 \\ n_2 \\ \vdots \\ n_L \end{bmatrix} \quad \text{Equation 6}$$

In Equation 6, $y_k$ denotes a receive signal vector of a pilot signal of the k-th terminal, L denotes a pilot length, $x_{k,j}$ denotes a j-th element of $x_k$, $U_k$ denotes the left singular vector matrix of the channel covariance matrix of the k-th terminal, and $n_k$ denotes a noise vector of the k-th terminal. In the matrix arranging products of the pilot signals and the left singular vector matrix of Equation 6, each column corresponds to each terminal and a space-time signature of each terminal.

The effective channel vector of every terminal can be estimated based on Equation 6. According to an embodiment of the present disclosure, least squares (LS) can be used. Using the LS, the effective channel vector of the terminals can be acquired based on Equation 7.

$$\begin{bmatrix} \hat{h}_1 \\ \hat{h}_2 \\ \vdots \\ \hat{h}_K \end{bmatrix} = (\bar{A}^H\bar{A})^{-1}\bar{A}^H\bar{y} \quad \text{Equation 7}$$

In Equation 7, $\hat{h}_K$ denotes the effective channel vector of the k-th terminal, $\bar{A}$ denotes a matrix including the transmission signal and the left singular vector matrix, and $\bar{y}$ denotes a receive signal vector. The terms of Equation 7 can be defined as Equation 8 and Equation 9.

$$y=[y_1^T,y_2^T,\ldots,y_K^T]^T \quad \text{Equation 8}$$

In Equation 8, $\bar{y}$ denotes the receive signal vector and $y_k$ denotes a receive signal vector for the pilot signal of the k-th terminal.

$$\bar{A} = \begin{bmatrix} x_{1,1}U_1 & x_{2,1}U_2 & \cdots & x_{K,1}U_K \\ x_{1,2}U_1 & x_{2,2}U_2 & \cdots & x_{K,2}U_K \\ \vdots & \vdots & \ddots & \vdots \\ x_{1,L}U_1 & x_{2,L}U_2 & \cdots & x_{K,L}U_K \end{bmatrix} \quad \text{Equation 9}$$

In Equation 9, $\bar{A}$ denotes a signature matrix, $x_{k,j}$ denotes the j-th element of $x_k$, and $U_k$ denotes the left singular vector matrix of the channel covariance matrix of the k-th terminal.

Since the size of the signature matrix $\bar{A}$ of Equation 9 is ML×KP and satisfies ML>KP, the channel estimation using the LS is enabled. Hence, with the spatial sparsity, that is, with P<M, the base station can support more terminals (=K>L) than the pilot length.

Figure 9A:
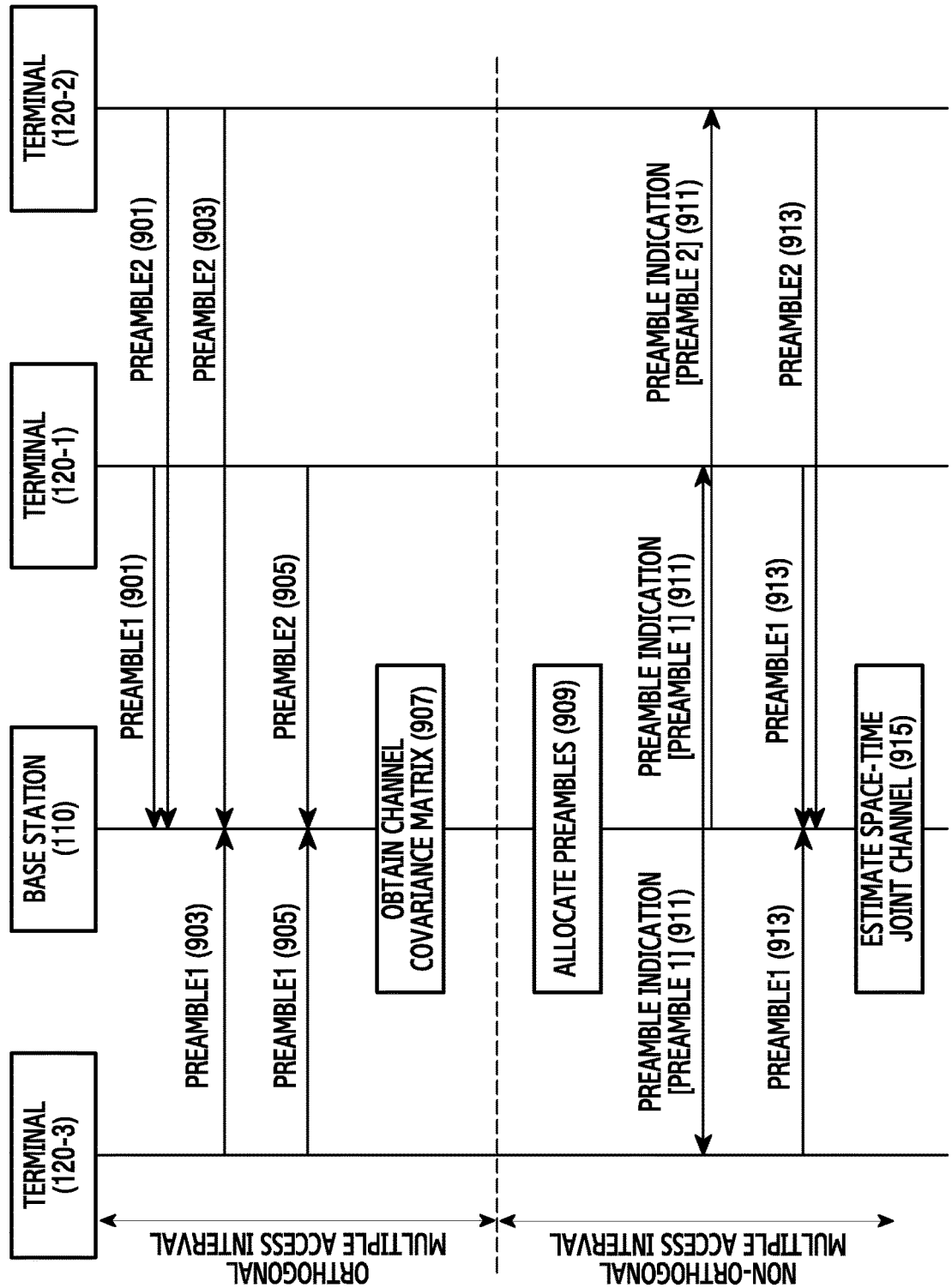
FIG. 9A depicts signals exchanged for channel estimation in a wireless communication system according to various embodiments of the present disclosure.

FIG. 9A depicts signals exchanged for channel estimation in a wireless communication system according to various embodiments of the present disclosure. In the present channel estimation method of FIG. 9A, three terminals 120-1 through 120-3 use two preambles including two orthogonal pilots.

Referring to FIG. 9A, in an orthogonal multiple access interval, the multiple access of two terminals is supported per subframe using the two preambles including the two orthogonal pilots in operations 901, 903, and 905. For example, the base station 110 can sequentially support the multiple accesses of the terminal 120-1 and the terminal 120-2, the terminal 120-2 and the terminal 120-3, and the terminal 120-1 and the terminal 120-3. In so doing, the base station 110 estimates channels of the two terminals per preamble transmission opportunity (e.g., subframe).

Figure 9B:
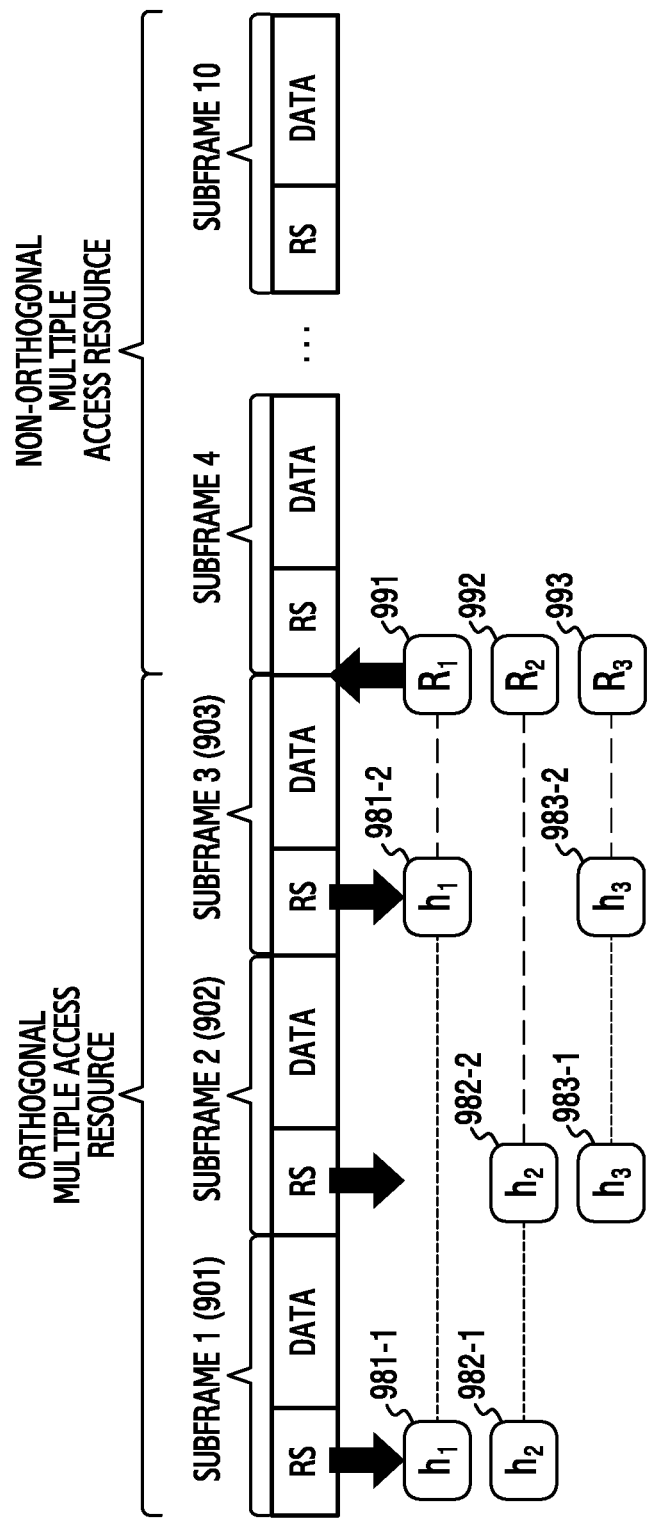
FIG. 9B depicts a covariance matrix determined for channel estimation in a wireless communication system according to various embodiments of the present disclosure.

FIG. 9B depicts a covariance matrix determined for channel estimation in a wireless communication system according to various embodiments of the present disclosure.

For example, referring to FIG. 9B, the base station 110 can estimate a channel 981-1 of the terminal 120-1 and a channel 982-1 of the terminal 120-2 based on preambles received in a first subframe 901, estimate a channel 982-2 of the terminal 120-2 and a channel 983-1 of the terminal 120-3 based on preambles received in a second subframe 902, and estimate a channel 981-2 of the terminal 120-1 and a channel 983-2 of the terminal 120-3 based on preambles received in a third subframe 903.

Before a start of a NOMA interval, the base station 110 estimates covariance matrixes of the terminals 120-1, 120-2, and 120-3 using the channels estimated per terminal in operation 907. For example, as shown in FIG. 9B, the base station 110 can estimate a covariance matrix 991 of the terminal 120-1 based on the channels 981-1 and 981-2 of the terminal 120-1 estimated in the first subframe 901 and the third subframe 903, estimate a covariance matrix 992 of the terminal 120-2 based on the channels 982-1 and 982-2 of the terminal 120-2 estimated in the first subframe 901 and the second subframe 902, and estimate a covariance matrix 993 of the terminal 120-3 based on the channels 983-1 and 983-2 of the terminal 120-3 estimated in the second subframe 902 and the third subframe 903.

In operation 909, the base station 110 allocates preambles to the terminals 120-1, 120-2, and 120-3 in the NOMA interval. In so doing, the preambles can be allocated based on the estimated covariance matrix. According to an embodiment of the present disclosure, the base station 110 can compare a chordal distance between the covariance matrixes, select two covariance matrixes of the longest chordal distance, and then allocate the same preambles to the terminals of the corresponding covariance matrixes. Provided that the chordal distance between the covariance matrixes of the terminal 120-1 and the terminal 120-2 is the longest, a first preamble can be allocated to the terminal 120-1 and the terminal 120-2 and a second preamble can be allocated to the terminal 120-3.

In operation 911, the base station 110 sends a preamble indication notifying the preamble allocation result to the terminals 120-1, 120-2, and 120-3. In operation 913, the terminals 120-1, 120-2, and 120-3 send the allocated preambles according to the NOMA. In operation 915, the base station 110 estimates a space-time joint channel.

Figure 10:
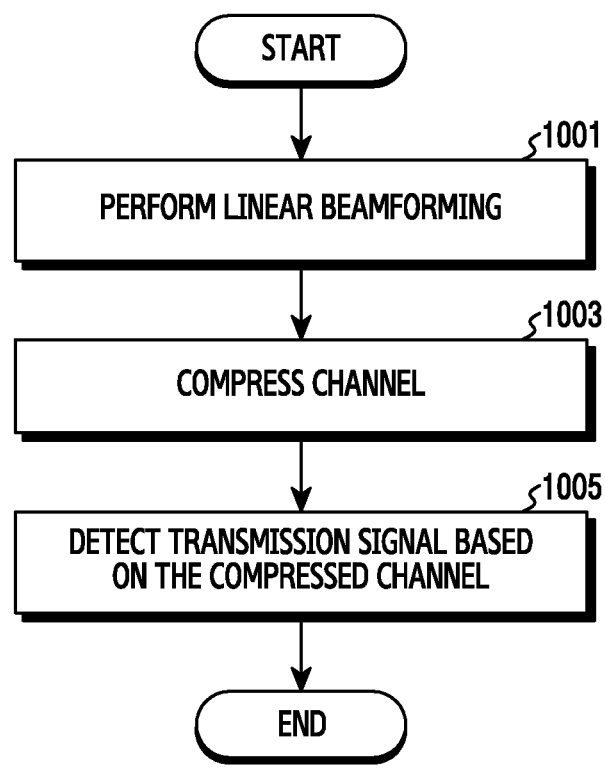
FIG. 10 depicts a signal detection method of a base station in a wireless communication system according to various embodiments of the present disclosure.

FIG. 10 depicts a method for detecting a signal in a base station in a wireless communication system according to various embodiments of the present disclosure. FIG. 10 illustrates an operating method of the base station 110.

Referring to FIG. 10, in operation 1001, the base station performs linear beamforming. Herein, the linear beamforming is the post-processing on received data signals and can be referred to as post coding. For example, the base station can perform the linear beamforming on the received data signal so as to concentrate a desired signal on a particular channel element. According to an embodiment of the present disclosure, the base station can perform maximum ratio combination (MRC) on the received data signals.

In operation 1003, the base station performs channel compression. Herein, the channel compression includes reducing a channel dimension for transmission signal detection. The base station can reduce the channel dimension in the signal detection by treating some of the channel elements as noise. Hence, the base station selects at least one of the channel elements as the noise. For example, the base station can select at least one element to exclude from the detection based on a channel element size.

In operation 1005, the base station detects transmission signals based on the compressed channel. For example, the base station can perform ML detection. Based on the channel compression result, the base station can exclude some of signal combinations to consider in the ML detection on the terminal basis. In other words, a signal of a first terminal of two terminals corresponding to the noise element is not considered as interference to a second terminal. Namely, the first terminal does not interfere with the second terminal. Accordingly, the number of the signal combinations considered in the ML detection can be reduced. According to another embodiment of the present disclosure, other MIMO detection method than the ML method can be used.

Figure 11:
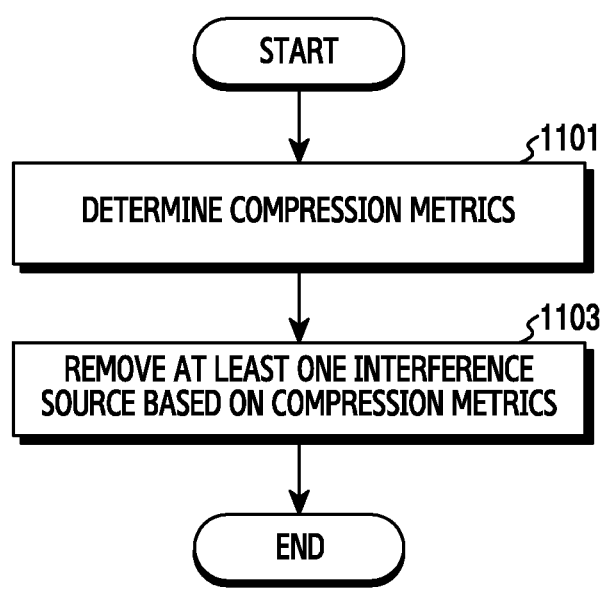
FIG. 11 depicts a channel compression method of a base station in a wireless communication system according to various embodiments of the present disclosure.

FIG. 11 depicts a channel compression method of a base station in a wireless communication system according to various embodiments of the present disclosure. FIG. 11 illustrates an operating method of the base station 110.

Referring to FIG. 11, in operation 1101, the base station determines compression metrics. Herein, the compression metric is used to select an element to be treated as noise, to compress a channel matrix. For example, the base station can determine the compression metrics based on an element size and a terminal channel size.

In operation 1103, the base station removes at least one interference source based on the compression metrics. Based on the compression metrics, the base station can treat at least one element of an effective channel matrix as interference. For example, when a compression metric of a first element is smaller than a product of a sum of a maximum value of compression metrics of other elements of the same column and a maximum value of compression metrics of other elements of the same row, and a weight, the first element can be treated as the noise. Based on the element treated as the noise, the base station can determine that, with respect to each terminal, at least one of other terminals is not the interference source. It is noted that, despite the channel compression, there can be a terminal which does not gain from the interference source reduction.

In the following, the signal detection of FIGS. 10 and 11 shall be explained in further detail with equations.

Given that a receive signal of the base station in data transmission of the terminal is y, y can be expressed as Equation 10.

$$[y]=[H][x]+[z] \qquad \text{Equation 10}$$

In Equation 10, y denotes a receive signal matrix, x denotes a transmission signal which arranges transmit data of terminals with a vector, H denotes a channel matrix between the terminals and the base station in the data transmission, and z denotes a noise vector.

The linear beamforming (e.g., operation 1001 of FIG. 10) can use linear combination of the receive signal using MRC beamforming. The receive signal linear-combined by the MRC can be expressed as Equation 11.

$$[\tilde{y}]=[H^H][y]=[\tilde{H}][x]+[\tilde{z}] \qquad \text{Equation 11}$$

In Equation 11, $\tilde{y}$ denotes a linear-combined effective receive signal matrix, H denotes a channel matrix, y denotes the receive signal matrix, $\tilde{H}=H^H H$ denotes an effective channel matrix, x denotes a transmission signal matrix, and $\tilde{z}$ denotes an effective noise vector. With a number of antennas (M>>1), the effective channel matrix can feature relatively great-size diagonal elements and relatively small-size non-diagonal elements.

In the channel decomposition (e.g., operation 1003 of FIG. 10), the base station determines whether to treat as noise according to the element size of the effective channel matrix. According to an embodiment of the present disclosure, whether to treat each element as noise can be determined based on Equation 12.

$$\alpha_{ii} \geq \delta \left( \max_{j \neq i} \alpha_{ji} + \max_{k \neq i} \alpha_{ik} \right) \qquad \text{Equation 12}$$

$$P_j = \frac{|x_j|^2}{\sigma^2}$$

$$\alpha_{ij} = \max\{0, \log_P(|\tilde{h}_{ij}|^2 P_j)\}$$

In Equation 12, $\alpha_{ii}$ denotes a compression metric for determining whether to treat an (i, j)-th channel matrix element as the noise, $\delta$ denotes a weight for the metric calculation, $P_j$ denotes a signal to noise ratio of a j-th terminal, $\sigma^2$ denotes a noise power, and $\tilde{h}_{ij}$ denotes an (i, j)-th element of the effective channel matrix.

Elements satisfying Equation 12 are processed as the noise. Other elements can be post-processed for interference cancellation. In Equation 12, $\delta$ is a system parameter that determines the criterion of treating as noise.

As $\delta$ increases, it is difficult to satisfy Equation 12 and accordingly the number of the elements treated as the noise reduces. When the noise-treating of the effective channel matrix elements is determined based on Equation 12 or based on other particular criterion for determining the noise-treating, the effective receive signal $\tilde{y}$ can be expressed as Equation 13.

$$\tilde{y} = \tilde{H}_1 x + \tilde{H}_2 x + \tilde{n}$$

$$= \begin{bmatrix} \tilde{h}_{1,1} & 0 & \tilde{h}_{1,3} & 0 & \tilde{h}_{1,5} \\ 0 & \tilde{h}_{2,2} & 0 & 0 & \tilde{h}_{2,5} \\ \tilde{h}_{3,1} & 0 & \tilde{h}_{3,3} & 0 & \tilde{h}_{3,5} \\ 0 & \tilde{h}_{4,2} & 0 & \tilde{h}_{4,4} & 0 \\ \tilde{h}_{5,1} & 0 & 0 & 0 & \tilde{h}_{5,5} \end{bmatrix} x +$$

$$\begin{bmatrix} 0 & \tilde{h}_{1,2} & 0 & \tilde{h}_{1,4} & 0 \\ \tilde{h}_{2,1} & 0 & \tilde{h}_{2,3} & \tilde{h}_{2,4} & 0 \\ 0 & \tilde{h}_{3,2} & 0 & \tilde{h}_{3,4} & 0 \\ \tilde{h}_{4,1} & 0 & \tilde{h}_{4,3} & 0 & \tilde{h}_{4,5} \\ 0 & \tilde{h}_{5,2} & \tilde{h}_{5,3} & \tilde{h}_{5,4} & 0 \end{bmatrix} x + \tilde{n}$$

Equation 13

In Equation 13, $\tilde{y}$ denotes the linear-combined effective receive signal matrix, $\tilde{H}_1$ denotes a first effective channel submatrix including elements not treated as the noise, $\tilde{H}_2$ denotes a second effective channel submatrix including elements treated as the noise, x denotes the transmission signal matrix, $\tilde{h}_{i,j}$ denotes the (i, j)-th element of the effective channel matrix, and $\tilde{n}$ denotes an effective noise matrix. When an effective noise signal is defined as $\tilde{n}_{eff}$ based on the receive signal by the noise treating matrix, Equation 13 can be expressed as Equation 14.

When the channel is compressed as shown in Equation 13, according to the first column of the first effective channel submatrix, the first terminal can exclude the second terminal and the fourth terminal from the interference source. Similarly, the second terminal can exclude the first terminal, the third terminal, and the fifth terminal from the interference source. The third terminal can exclude the second terminal, the fourth terminal, and the fifth terminal from the interference source.

$$\tilde{y} = \tilde{H}_1 x + (\tilde{H}_2 x + \tilde{n}) = \tilde{H}_1 x + \tilde{n}_{eff}$$

Equation 14

In Equation 14, $\tilde{y}$ denotes the linear-combined effective receive signal matrix, $\tilde{H}_1$ denotes the first effective channel submatrix including the elements not treated as the noise, $\tilde{H}_2$ denotes the second effective channel submatrix including the elements treated as the noise, x denotes the transmission signal matrix, $\tilde{n}$ denotes the effective noise matrix, and $\tilde{n}_{eff}$ denotes an effective noise signal including the noise-treated data signal.

In the low-complexity ML decoding (e.g., operation 1005 of FIG. 10), the base station can perform the ML detection based on Equation 14.

The channel matrix $\tilde{H}_1$, which includes the elements not treated as the noise in the effective channel matrix $\tilde{H}$, can be regarded as a sparse matrix including a plurality of zero elements. High implementation complexity is required to apply the ML detection to a general channel matrix having no sparsity. By contrast, the ML detection on the sparse matrix can be implemented with low complexity using a message passing algorithm or belief propagation. Hence, when the message passing algorithm is applied together with the channel decomposition, the base station can execute the ML detection of low complexity. For example, the complexity of the ML detection on the general channel matrix is expressed as Equation 15, and the complexity of the ML detection on the sparse matrix is expressed as Equation 16.

$$\mathcal{O}(M|\mathcal{L}|^K)$$

Equation 15

In Equation 15, M denotes the number of antennas of the base station, L denotes a modulation size, and K denotes the number of active terminals.

$$\mathcal{O}\left(\frac{cMK}{\delta}|\mathcal{L}|\right)$$

Equation 16

In Equation 16, c denotes a constant, M denotes the number of the antennas of the base station, L denotes the modulation size, K denotes the number of the active terminals, and δ denotes a weight to calculate a metric used to select the element to be treated as the noise.

Figure 12:
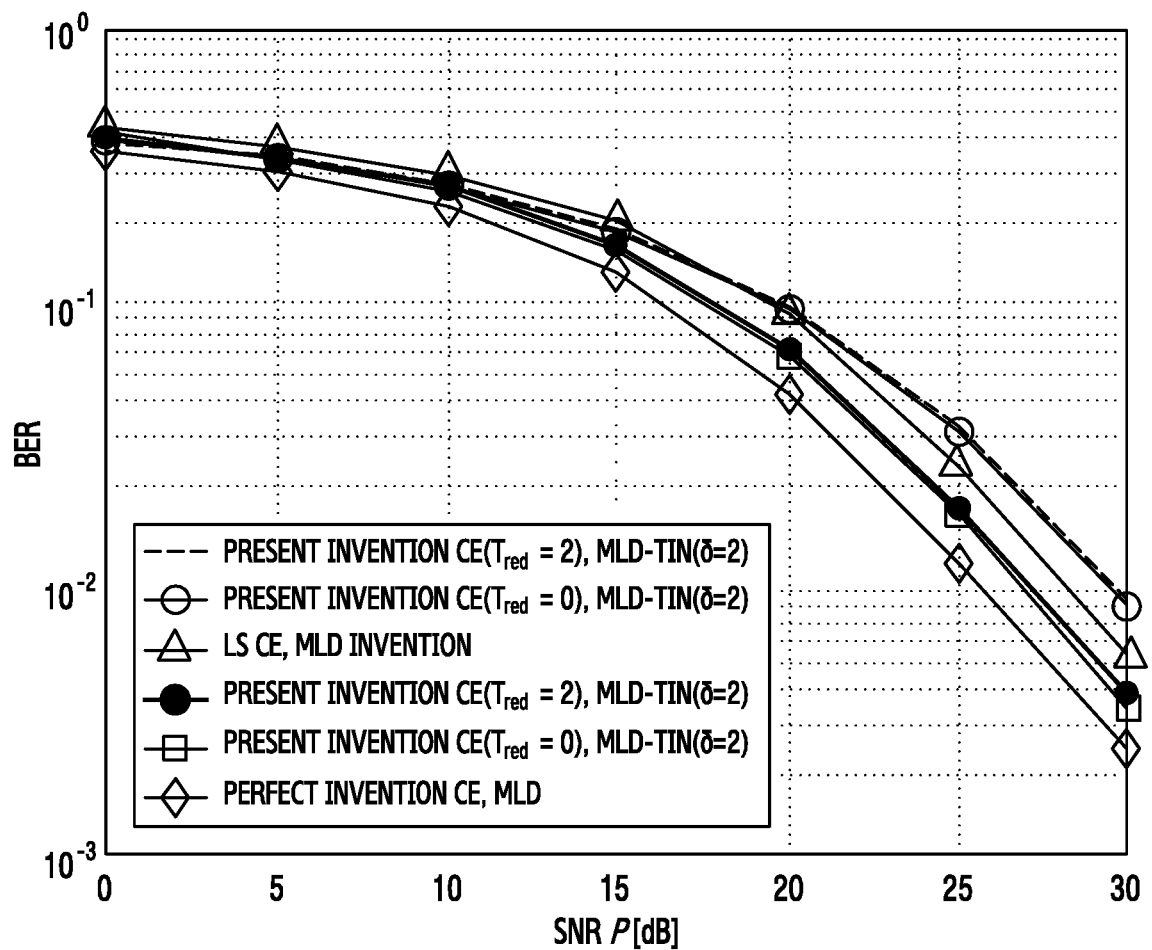
FIG. 12 depicts a performance analysis graph of a wireless communication system according to various embodiments of the present disclosure.

FIG. 12 depicts a performance analysis graph of a wireless communication system according to various embodiments of the present disclosure.

Referring to FIG. 12, simulation results of the performance compared when a base station including eight antennas (M=8) and twelve terminals (K=12) perform the multiple access using binary phase-shift keying (BPSK) modulation are illustrated. In the simulation, P=12 of Equation 2 is assumed. A method of the related art uses a pilot signal which is L=K=12 in length, and the present method uses a pilot signal which is L=K-$T_{red}$ in length.

Legends of FIG. 12 indicate, from the bottom, the ML detection on perfect channel information, the present channel estimation method and the ML detection ($T_{red}$=0 or $T_{red}$=2), LS channel estimation and ML detection of the related art, and the present channel estimation method and the present decoding method ($T_{red}$=0 or $T_{red}$=2).

Referring to FIG. 12, using the ML detection, the present channel estimation method exhibits better performance than the LS channel estimation. Even when the pilot length is decreased by 2, the present method achieves a lower bit error rate than the method of the related art. The present detection method exhibits a higher bit error rate than the ML detection but their difference is not considerable. Instead, the present detection method features low implementation complexity. Accordingly, when the present detection method is used according to the system parameter and the wireless environment, error performance degradation can be minimized and the implementation complexity can be reduced.

An apparatus and a method according to various embodiments of the present disclosure use the channel information acquired in the orthogonal multiple access interval and compress the channel, thus reducing the length of the reference signal required for the channel estimation and further lessening the implementation complexity of the signal detection.

Methods according to various embodiments mentioned in claims or specification of the present disclosure may be implemented in the form of hardware, software, or a combination of the hardware and the software. In case where the methods are implemented by software, a computer-readable storage medium storing one or more programs (i.e., software modules) may be provided. The one or more programs stored in the computer-readable storage medium are configured to be executable by one or more processors within an electronic device. The one or more programs include instructions for enabling the electronic device to execute the methods according to the various embodiments stated in the claims or specification of the present disclosure.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

Further, the program may be stored in an attachable storage device that may gain access through a communication network, such as the Internet, an intranet, a local area network (LAN), a wireless LAN (WLAN) or a storage area network (SAN), or a communication network constructed in combination of them. This storage device may connect to a device performing an embodiment of the present disclosure through an external port. In addition, a separate storage device on the communication network may connect to the device performing the various embodiment of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a terminal in a wireless communication system, the method comprising:
   transmitting at least one first reference signal through a first resource that supports an orthogonal multiple access with at least one other terminal;
   transmitting at least one second reference signal through a second resource that supports a non-orthogonal multiple access (NOMA) with the at least one other terminal; and
   transmitting a data signal according to the NOMA with the at least one other terminal,
   wherein the at least one second reference signal include at least one sequence that is determined based on the at least one first reference signal, and
   wherein the at least one second reference signal are used to generate joint channel information based on a signature matrix for a plurality of terminals of the NOMA.

2. The method of claim 1,
   wherein the at least one first reference signal is used to generate long-term channel information, and
   wherein the at least one second reference signal is used to generate the joint channel information for the NOMA of the at least one other terminal and the terminal.

3. The method of claim 1, further comprising:
   receiving allocation information of the first resource.

4. The method of claim 1, further comprising:
   receiving allocation information of the at least one second reference signal.

5. A method for operating a base station in a wireless communication system, the method comprising:
   receiving first reference signals through a first resource that supports an orthogonal multiple access with a plurality of terminals;
   receiving second reference signals through a second resource that supports a non-orthogonal multiple access (NOMA) with the plurality of terminals; and
   receiving data signals from the plurality of terminals according to the NOMA,
   generating a signature matrix based on the second reference signals,
   generating joint channel based on the signature matrix,
   wherein the second reference signals include at least one sequence that is determined based on the first reference signals, and
   wherein the second reference signals are used to generate joint channel information based on a signature matrix for the plurality of terminals of the NOMA.

6. The method of claim 5, further comprising:
   generating long-term channel information of each of the plurality of terminals based on the first reference signals; and
   generating the joint channel information for the NOMA of the plurality of terminals based on the second reference signals and the long-term channel information.

7. The method of claim 6, wherein the joint channel information is determined using a left singular vector matrix acquired by singular value decomposition of the long-term channel information.

8. The method of claim 5, further comprising:
   detecting transmission signals of the plurality of terminals from the data signals.

9. The method of claim 8, wherein the detecting of the transmission signals comprises:
   decreasing a number of interference sources for at least one terminal based on a joint channel for the NOMA of the plurality of terminals, and
   performing a maximum likelihood detection based on the decreased interference sources.

10. The method of claim 9, wherein the decreasing of the number of the interference sources comprises:
    generating an effective channel by performing a maximum ratio combination (MRC) on the joint channel, and
    treating at least one element as a noise based on a magnitude of each of element of the effective channel.

11. The method of claim 10, wherein the treating of the at least one element as the noise comprises:

generating compression metrics of elements of the effective channel, and treating a first element as the noise, if a compression metric of the first element is smaller than a product of a sum of a maximum value of compression metrics of other elements of a same column and a maximum value of compression metrics of other elements of a same row, and a weight.

12. An apparatus of a base station in a wireless communication system, the apparatus comprising:

a transceiver configured to receive a signal; and at least one processor operatively coupled to the transceiver, wherein the at least one processor is configured to:

receive first reference signals through a first resource that supports an orthogonal multiple access with a plurality of terminals, receive second reference signals through a second resource that supports a non-orthogonal multiple access (NOMA) with the plurality of terminals, and receive data signals from the plurality of terminals according to the NOMA, generate a signature matrix based on the second reference, and generate joint channel based on the signature matrix, and wherein the second reference signals include at least one sequence that is determined based on the first reference signals, and wherein the second reference signals are used to generate joint channel information based on a signature matrix for the plurality of terminals of the NOMA.

13. The apparatus of claim 12, wherein the at least one processor is further configured to:

generate long-term channel information of the plurality of terminals based on the first reference signals, and generate the joint channel information for the NOMA of the plurality of terminals based on the second reference signals and the long-term channel information.

14. The apparatus of claim 13, wherein the joint channel information is determined using a left singular vector matrix acquired by singular value decomposition of the long-term channel information.

15. The apparatus of claim 12, wherein the at least one processor is further configured to:

detect transmission signals of the plurality of terminals from the data signals.

16. The apparatus of claim 15, wherein the at least one processor is further configured to:

decrease a number of interference sources for at least one terminal based on a joint channel for the NOMA of the plurality of terminals, and perform a maximum likelihood detection based on the decreased interference sources.

17. The apparatus of claim 16, wherein the at least one processor is further configured to:

generate an effective channel by performing a maximum ratio combination (MRC) on the joint channel, and treat at least one element as a noise based on a magnitude of each of element of the effective channel.

18. The apparatus of claim 17, wherein the at least one processor is further configured to:

generate compression metrics of elements of the effective channel, and treat a first element as the noise, if a compression metric of the first element is smaller than a product of a sum of a maximum value of compression metrics of other elements of a same column and a maximum value of compression metrics of other elements of a same row, and a weight.

* * * * *